United States Patent
Nomizo (10) Patent No.: US 8,659,506 B2
(45) Date of Patent: Feb. 25, 2014

(54) IMAGE TRANSFER METHOD, IMAGE TRANSFER SYSTEM, AND PROJECTOR (75) Inventor: Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 441 days.

(21) Appl. No.: 13/034,234

(22) Filed: Feb. 24, 2011

(65) Prior Publication Data
US 2011/0215989 A1 Sep. 8, 2011

(30) Foreign Application Priority Data
Mar. 4, 2010 (JP) .................. 2010-047955

(51) Int. Cl.
G09G 5/00 (2006.01)
G06F 15/16 (2006.01)

(52) U.S. Cl.
USPC .............................. 345/2.3; 345/1.2; 709/227

(58) Field of Classification Search
USPC ............... 345/1.2, 2.1–2.3; 349/5; 348/14.08; 709/227
See application file for complete search history.

(56) References Cited

U.S. PATENT DOCUMENTS

| | | | | |
|---|---|---|---|---|
| 5,924,013 A | * | 7/1999 | Guido et al. | 725/67 |
| 6,922,743 B2 | * | 7/2005 | Mizuno | 710/38 |
| 8,359,051 B2 | | 1/2013 | Marsden et al. | |
| 2003/0126326 A1 | | 7/2003 | Nomizo et al. | |
| 2013/0107770 A1 | | 5/2013 | Marsden et al. | |

FOREIGN PATENT DOCUMENTS

| | | |
|---|---|---|
| CN | 1463522 A | 12/2003 |
| JP | H2-156358 | 6/1990 |
| JP | A-2000-209560 | 7/2000 |
| JP | A-2003-018676 | 1/2003 |
| JP | A-2003-198994 | 7/2003 |
| JP | A-2005-18460 | 1/2005 |
| JP | A-2006-221423 | 8/2006 |
| JP | 2009-081804 | 4/2009 |

* cited by examiner

Primary Examiner — Alexander S Beck
Assistant Examiner — Sejoon Ahn
(74) Attorney, Agent, or Firm — Oliff PLC (57) ABSTRACT An image transfer method for transferring image data to a plurality of projectors from an image supply unit, wherein the image supply unit generates a transmission destination information list showing a transmission destination of the image data and transmits the image data and the transmission destination information list to a transmission destination projector of the image data, the transmission destination projector determined based on the transmission destination information list, and the projector receives the image data and the transmission destination information list from the image supply unit or another projector and transfers the image data to the plurality of projectors by repeating the process for transmitting the image data to one projector which has not received the image data, the one projector determined based on the transmission destination information list.

5 Claims, 8 Drawing Sheets

| | |
|---|---|
| Projector1 (OR IP ADDRESS OF projector1) | |
| Projector2 (OR IP ADDRESS OF projector2) | |
| Projector3 (OR IP ADDRESS OF projector3) | |
| Projector4 (OR IP ADDRESS OF projector4) | |
| . . . . . | |

FIG. 4B

| |
|---|
| Projector2 (OR IP ADDRESS OF projector2) |
| Projector3 (OR IP ADDRESS OF projector3) |
| Projector4 (OR IP ADDRESS OF projector4) |
| . . . . . |

FIG. 4C

| |
|---|
| Projector3 (OR IP ADDRESS OF projector3) |
| Projector4 (OR IP ADDRESS OF projector4) |
| . . . . |

FIG. 4D

| | |
|---|---|
| Projector1 (OR IP ADDRESS OF projector1) | 1 |
| Projector2 (OR IP ADDRESS OF projector2) | 0 |
| Projector3 (OR IP ADDRESS OF projector3) | 0 |
| Projector4 (OR IP ADDRESS OF projector4) | 0 |
| . . . . | |

| Projector1 (OR IP ADDRESS OF projector1) | 10 |
| --- | --- |
| Projector2 (OR IP ADDRESS OF projector2) | 10 |
| Projector3 (OR IP ADDRESS OF projector3) | 20 |
| Projector4 (OR IP ADDRESS OF projector4) | 20 |
| Projector5 (OR IP ADDRESS OF projector4) | 30 |
| Projector6 (OR IP ADDRESS OF projector4) | 30 |

FIG. 8B

| Projector3 (OR IP ADDRESS OF projector3) | 20 |
| --- | --- |
| Projector4 (OR IP ADDRESS OF projector4) | 20 |
| Projector5 (OR IP ADDRESS OF projector4) | 30 |
| Projector6 (OR IP ADDRESS OF projector4) | 30 |

FIG. 8C

| Projector1 (OR IP ADDRESS OF projector1) | 10 |
| --- | --- |
| Projector2 (OR IP ADDRESS OF projector2) | 10 |

FIG. 8D

| projector5 (OR IP ADDRESS OF projector4) | 30 |
| --- | --- |
| projector6 (OR IP ADDRESS OF projector4) | 30 |

FIG. 8E

| projector3 (OR IP ADDRESS OF projector3) | 20 |
| --- | --- |
| projector4 (OR IP ADDRESS OF projector4) | 20 |

FIG. 9

IMAGE TRANSFER METHOD, IMAGE TRANSFER SYSTEM, AND PROJECTOR

CROSS-REFERENCE

The entire disclosure of Japanese Patent Application No. 2010-047955 filed Mar. 4, 2010 is expressly incorporated by reference herein.

BACKGROUND

1. Technical Field

The present invention relates to technologies for transmitting image data to a plurality of projectors via a network.

2. Related Art

The technologies for transmitting image data to a plurality of projectors from a personal computer by unicast and the technologies for transmitting image data to a plurality of projectors from a personal computer by multicast have been known (for example, JP-A-2000-209560 and JP-A-2005-18460).

However, when the personal computer transmits the image data to the plurality of projectors by unicast, the personal computer and the network are under heavy load. Moreover, when the personal computer transmits the image data by multicast, a router has to support multicast and a transmission destination list has to be registered in the router in advance.

SUMMARY

An advantage of some aspects of the invention is to solve at least part of the problems described above and to reduce the load on an image supply unit without providing a device such as a multicast-capable router when image data is transmitted to a plurality of projectors from the image supply unit such as a personal computer.

The invention can be realized as forms or application examples described below.

Application Example 1

According to this application example, there is provided an image transfer method for transferring image data between a plurality of projectors, wherein the method:

(a) receives image data and a transmission destination information list including at least one projector as a transmission destination from another projector;

(b) determines one projector of the plurality of projectors based on the transmission destination information list;

(c) updates the transmission destination information list;

(d) transmits the updated transmission destination information list to the projector thus determined along with the image data; and (e) sequentially transfers the image data and the updated transmission destination information list between the plurality of projectors by repeating the processes (a) to (d).

According to this application example, since the image data can be transferred between the projectors, it is possible to reduce the load on the image supply unit which supplies the image data to the projector.

Application Example 2

In the image transfer method described in Application Example 1, in the process (b), (b-1) when another projector which has not yet received the image data and the transmission destination information list is present in the same network segment as a network segment to which the projector belongs, the method determines one projector in the same network segment as the network segment to which the projector belongs, and (b-2) when another projector which has not yet received the image data or the transmission destination information list is not present in the same network segment as the network segment to which the projector belongs, the method determines one projector which belongs to a network segment different from the network segment to which the projector belongs and has the smallest number of hops from the image supply unit.

According to this application example, since the image data etc. is not transmitted to the original network segment, it is possible to suppress an increase in the total number of hops in data transmission and reduce the load on the network.

Application Example 3

In the image transfer method described in Application Example 1, in the process (a), when a transmission source of the image data and the transmission destination information list belongs to the same network segment as the network segment to which the projector belongs, in the processes (b) and (d), the method (b-1) determines one projector which belongs to the same network segment as the network segment to which the projector belongs and has not yet received the image data based on the transmission destination information list, and (d-1) transmits the updated transmission destination information list obtained by updating the transmission destination information list to the projector thus determined along with the image data, and in the process (a), when the transmission source of the image data and the transmission destination information list belongs to a network segment different from the network segment to which the projector belongs, in the process (c), the method generates a first transmission destination information list to be transmitted to another projector which belongs to a network segment different from the network segment to which the projector belongs and a second transmission destination information list to be transmitted to another projector which belongs to the same network segment as the network segment to which the projector belongs by using the transmission destination information list, and in the processes (b) and (d), the method (b-2) determines one projector which belongs to a network segment different from the network segment to which the projector belongs and has the smallest number of hops from the projector which performs transmission of the image data based on the first transmission destination information list, (d-2) transmits the image data and the first transmission destination information list to the projector thus determined, (b-3) determines one projector which belongs to the same network segment as the network segment to which the projector belongs and has not yet received the image data based on the second transmission destination information list, and (d-3) transmits the image data and the second transmission destination information list to the projector thus determined.

According to this application example, since transmission of the image data can be performed concurrently in a plurality of network segments, it is possible to reduce the number of process steps in communication.

Application Example 4

According to this application example, there is provided an image transfer system which supplies image data to a plurality of projectors from an image supply unit via a network, including:

an image supply unit supplying image data; and a plurality of projectors which project an image based on the image data, wherein the image supply unit includes a transmission destination information list generating section generating a transmission destination information list for determining a transmission destination of the image data, a transmission destination determining section determining, based on the transmission destination information list, a transmission destination projector to which the image data is transmitted, and a transmitting section transmitting the image data and the transmission destination information list to the transmission destination projector determined by the transmission destination determining section, and the projector includes a receiving section receiving the image data and the transmission destination information list including a plurality of projectors as a transmission destination from the image supply unit or another projector, a transmission destination determining section determining, based on the transmission destination information list, one projector of the plurality of projectors, a transmission destination information list updating section updating the transmission destination information list, a transmitting section transmitting the updated transmission destination information list to the projector thus determined along with the image data, and a projecting section projecting an image based on the image data.

According to this application example, it is possible to reduce the load on the image supply unit without providing a device such as a multicast-capable router.

Application Example 5

According to this application example, there is provided a projector, including:

a receiving section receiving image data and a transmission destination information list including at least one projector as a transmission destination from an image supply unit or another projector;

a transmission destination determining section determining one projector of a plurality of projectors based on the transmission destination information list;

a transmission destination information list updating section updating the transmission destination information list;

a transmitting section transmitting the updated transmission destination information list to the projector thus determined along with the image data; and a projecting section projecting an image based on the image data.

According to this application example, when the projector designated as a transmission destination projector receives the image data and the transmission destination information list from the image supply unit, the projector designates another projector as a new transmission destination projector and transmits the image data and the transmission destination information list thereto. Therefore, since the image data can be transferred between the projectors, it is possible to reduce the load on the image supply unit which supplies the image data to the projector.

Application Example 6

In the projector described in Application Example 5, when another projector which has not yet received the image data or the transmission destination information list is present in the same network segment as a network segment to which the projector belongs, the projector determines one projector in the same network segment as the network segment to which the projector belongs, and when another projector which has not yet received the image data or the transmission destination information list is not present in the same network segment as the network segment to which the projector belongs, the projector determines one projector which belongs to a network segment different from the network segment to which the projector belongs and has the smallest number of hops from the image supply unit.

According to this application example, when the image data and the transmission destination information list have already been transmitted to the other projectors in the network segment to which the projector belongs, the projector which has received the image data and the transmission destination information list does not transmit the image data etc. to the network segment. This makes it possible to suppress an increase in the total number of hops in data transmission and reduce the load on the network.

Application Example 7

In the projector described in Application Example 5, when a transmission source of the image data and the transmission destination information list belongs to the same network segment as the network segment to which the projector belongs, the projector determines one projector which belongs to the same network segment as the network segment to which the projector belongs and has not yet received the image data based on the transmission destination information list, and transmits the updated transmission destination information list obtained by updating the transmission destination information list to the projector thus determined along with the image data, and when the transmission source of the image data and the transmission destination information list belongs to a network segment different from the network segment to which the projector belongs, the projector generates a first transmission destination information list to be transmitted to another projector which belongs to a network segment different from the network segment to which the projector belongs and a second transmission destination information list to be transmitted to another projector which belongs to the same network segment as the network segment to which the projector belongs by using the transmission destination information list, determines, based on the first transmission destination information list, one projector which belongs to a network segment different from the network segment to which the projector belongs and has the smallest number of hops from the projector which performs transmission of the image data, transmits the image data and the first transmission destination information list to the projector thus determined, determines, based on the second transmission destination information list, one projector which is included in the same network segment as the network segment to which the projector belongs and has not yet received the image data, and transmits the image data and the second transmission destination information list to the projector thus determined.

According to this application example, since transmission of the image data can be performed concurrently in a plurality of network segments, it is possible to reduce the number of process steps in communication.

Application Example 8

According to this application example, there is provided an image transfer method for supplying, from an image supply unit via a network, image data to a plurality of projectors which project an image based on the image data, wherein the image supply unit (A) generates a transmission destination information list for determining a transmission destination of the image data, (B) determines a transmission destination projector to which the image data is transmitted based on the transmission destination information list, and (C) transmits the image data and the transmission destination information list to the transmission destination projector thus determined, and the projector (D) receives, from the image supply unit or another projector, the image data and the transmission destination information list including at least one projector as a transmission destination, (E) determines one projector of the plurality of projectors based on the transmission destination information list, (F) updates the transmission destination information list, (G) transmits the updated transmission destination information list to the projector thus determined along with the image data, and (H) sequentially transfers the image data and the updated transmission destination information list between the plurality of projectors by repeating the processes (D) to (G).

According to this application example, the image supply unit transmits the image data and the transmission destination information list to the projector designated as a transmission destination projector. When the projector designated as a transmission destination projector receives the image data and the transmission destination information list from the image supply unit, the projector designates another projector as a new transmission destination projector, and transmits the image data and the transmission destination information list thereto. Therefore, it is possible to reduce the load on the image supply unit without providing a device such as a multicast-capable router.

Application Example 9

In the image transfer method described in Application Example 8, when at least one of the plurality of projectors belongs to a network segment which is different from a network segment to which the image supply unit belongs, in the process (B), the image supply unit, (B-1) when a projector which has not yet received the image data or the transmission destination information list is present in the same network segment as the network segment to which the image supply unit belongs, determines one projector in the same network segment as the network segment to which the image supply unit belongs based on the transmission destination information list, and (B-2) when a projector which has not yet received the image data is not present in the same network segment as the network segment to which the image supply unit belongs, determines one projector which belongs to a network segment different from the network segment to which the image supply unit belongs and has the smallest number of hops from the image supply unit, in the process (E), the projector, (E-1) when another projector which has not yet received the image data or the transmission destination information list is present in the same network segment as the network segment to which the projector belongs, determines one projector in the same network segment as the network segment to which the projector belongs, and (E-2) when another projector which has not yet received the image data or the transmission destination information list is not present in the same network segment as the network segment to which the projector belongs, determines one projector which belongs to a network segment different from the network segment to which the projector belongs and has the smallest number of hops from the image supply unit.

According to this application example, when the image data and the transmission destination information list have already been transmitted to the other projectors in the network segment to which the projector belongs, the projector which has received the image data and the transmission destination information list does not transmit the image data etc. to the network segment. This makes it possible to suppress an increase in the total number of hops in data transmission and reduce the load on the network.

Application Example 10

In the image transfer method described in Application Example 8, when at least one of the plurality of projectors belongs to a network segment which is different from a network segment to which the image supply unit belongs, in the process (A), the image supply unit (A-1) generates a first transmission destination information list to be transmitted to a projector which belongs to a network segment different from the network segment to which the image supply unit belongs and a second transmission destination information list to be transmitted to a projector which belongs to the same network segment as the network segment to which the image supply unit belongs, and in the processes (B) and (C), (B-2) determines one projector which belongs to a network segment different from the network segment to which the image supply unit belongs and has the smallest number of hops from the image supply unit, (C-2) transmits the image data and the first transmission destination information list to the projector thus determined, (B-3) determines one projector which belongs to the same network segment as the network segment to which the image supply unit belongs and has not yet received the image data, and (C-3) transmits the image data and the second transmission destination information list to the projector thus determined, and in the process (D), when a transmission source of the image data and the transmission destination information list belongs to the same network segment as the network segment to which the projector belongs, in the processes (E) and (G), the projector (E-1) determines one projector which belongs to the same network segment as the network segment to which the projector belongs and has not yet received the image data based on the transmission destination information list, and (G-1) transmits the updated transmission destination information list obtained by updating the transmission destination information list to the projector thus determined along with the image data, and in the process (D), when the transmission source of the image data and the transmission destination information list belongs to a network segment different from the network segment to which the projector belongs, in the process (F), the projector generates a third transmission destination information list to be transmitted to another projector which belongs to a network segment different from the network segment to which the projector belongs and a fourth transmission destination information list to be transmitted to another projector which belongs to the same network segment as the network segment to which the projector belongs by using the transmission destination information list, and in the processes (E) and (G), the projector (E-2) determines, based on the third transmission destination information list, one projector which belongs to a network segment different from the network segment to which the projector belongs and has the smallest number of hops from the projector which performs transmission of the image data, (G-2) transmits the image data and the third transmission destination information list to the projector thus determined, (E-3) determines, based on the fourth transmission destination information list, one projector which is included in the same network segment as the network segment to which the projector belongs and has not yet received the image data, and (G-3) transmits the image data and the fourth transmission destination information list to the projector thus determined.

According to this application example, since transmission of the image data can be performed concurrently in a plurality of network segments, it is possible to reduce the number of process steps in communication.

The invention can be realized in various forms such as an image transfer system and a projector in addition to an image transfer method.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
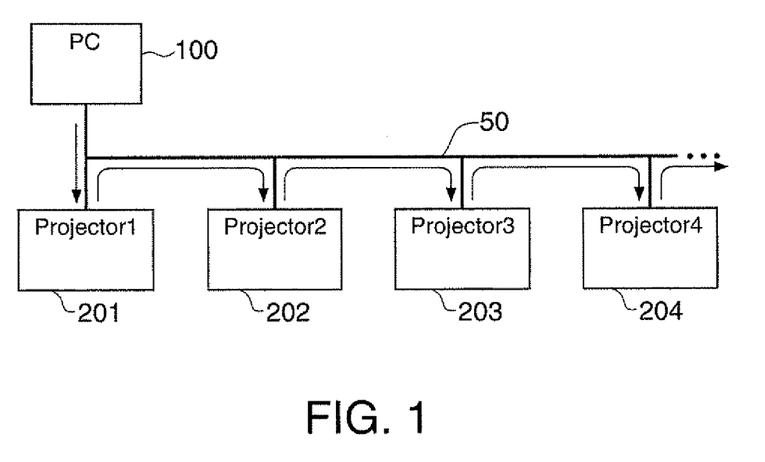
FIG. 1 is an explanatory diagram explaining the outline of a first embodiment.

FIG. 1 is an explanatory diagram explaining the outline of a first embodiment. An image data transfer system includes a computer 100 and projectors 201 to 204. The computer 100 and the projectors 201 to 204 are connected to a network cable 50. The computer 100 transmits, to the projector 201, image data to be displayed by the projector (hereinafter referred to simply as "image data") and a transmission destination information list. The transmission destination information list is a list of information showing the projector to which projector the image data is transferred (transmitted). The projector 201 displays the image data on a screen (not shown) and updates the transmission destination information list, and transmits the image data and the updated transmission destination information list to the projector 202. How the transmission destination information list is updated will be described later. Then, the projector 202 and the projector 203 transmit the image data and the updated transmission destination information list to the projector 203 and the projector 204, respectively. That is, the projectors each transfer the image data and the updated transmission destination information list sequentially to the next projector.

Figure 2:
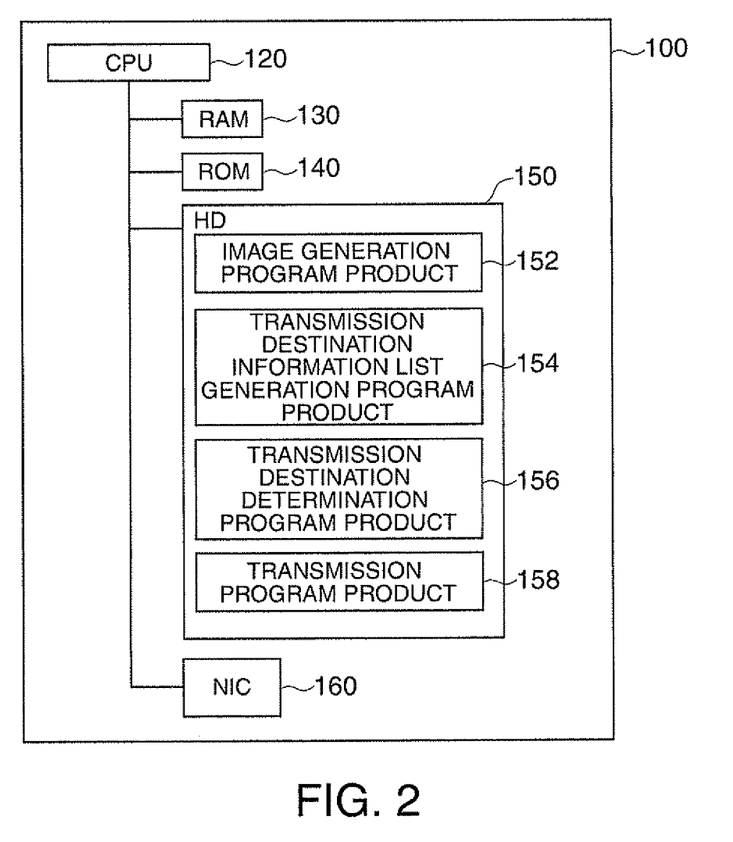
FIG. 2 is an explanatory diagram showing the configuration of a computer.

FIG. 2 is an explanatory diagram showing the configuration of the computer. The computer 100 includes a CPU 120, RAM 130, ROM 140, a hard disk 150, and a network interface (NIC) 160. The hard disk 150 has an image generation program 152, a transmission destination information list generation program 154, a transmission destination determination program 156, and a transmission program 158. These programs are executed by the CPU 120, and realize the functions described below. Here, the transmission destination information list generation program 154 corresponds to a transmission destination information list generating section in the claims, the transmission destination determination program 156 corresponds to a transmission destination determining section in the claims, and the transmission program 158 corresponds to a transmitting section in the claims. Incidentally, in this embodiment, the computer 100 includes the hard disk 150; however, a configuration which the computer 100 includes an SSD (solid state drive) or nonvolatile memory such as flash memory instead of the hard disk may be adopted.

The image generation program 152 generates image data to be transmitted to the projectors 201 to 204. The transmission destination information list generation program 154 creates a transmission destination information list in which the identification names or the IP addresses of the transmission destination projectors to which the image data is transmitted are arranged in order of transmission. The transmission destination information list generation program 154 creates the transmission destination information list in the manner described below, for example.

The transmission destination information list generation program 154 arranges the projectors 201 to 204 in increasing order of distance from the computer 100. Arranging the projectors in increasing order of distance from the computer 100 means arranging the projectors in order of increasing number of routers through which the data passes until the data reaches the projector from the computer 100. In general, the number of routers of the network, the routers through which the IP packet passes, is referred to as the number of hops. The transmission destination information list generation program 154 first arranges the projectors in order, the projectors belonging to the same network segment (the number of hops: 0) as the network segment to which the computer 100 belongs. Here, when, for example, a network address part of the IP address of the computer 100 and a network address part of the IP address of the projector 201 are the same, the computer 100 and the projector belong to the same network segment. Incidentally, the projectors in the same network segment may be arranged in any order.

Next, the transmission destination information list generation program 154 arranges the projectors in order, the projectors whose number of hops from the computer 100 is 1. Then, the transmission destination information list generation program 154 arranges the projectors in order in the same manner in each number of hops by increasing the number of hops from the computer 100 by 1.

Based on the transmission destination information list, the transmission destination determination program 156 determines a transmission destination projector to which the image data is transmitted. Specifically, the transmission destination determination program 156 determines the projector which is at the top of the transmission destination information list as a transmission destination. The transmission program 158 transmits the image data and the transmission destination information list to the transmission destination projector determined by the transmission destination determination program 156.

Figure 3:
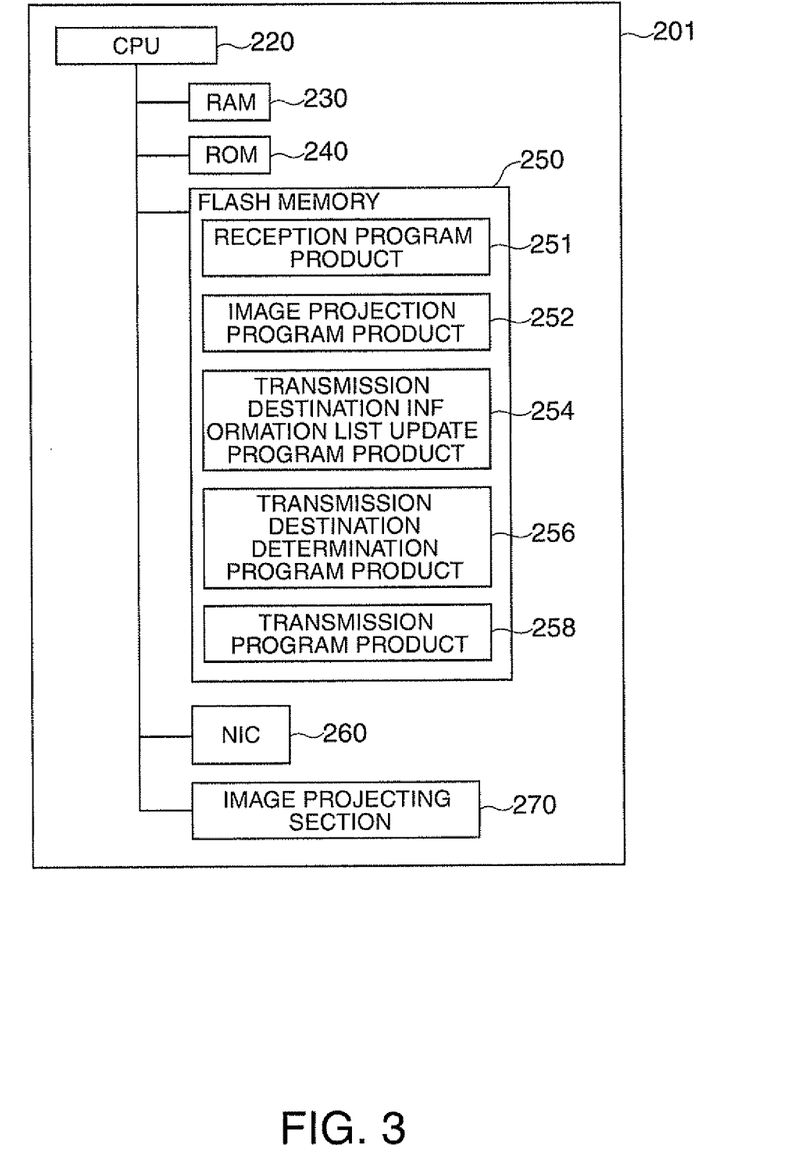
FIG. 3 is an explanatory diagram showing the configuration of a projector.

FIG. 3 is an explanatory diagram showing the configuration of the projector. Since the projectors 201 to 204 have the same configuration, the projector 201 will be described here as an example. The projector 201 includes a CPU 220, RAM 230, ROM 240, flash memory 250, an NIC 260, and an image projecting section 270. The flash memory 250 has a reception program 251, an image projection program 252, a transmission destination information list update program 254, a transmission destination determination program 256, and a transmission program 258. These programs are executed by the CPU 220, and realize the functions described below. The reception program 251 corresponds to a receiving section in the claims, and the transmission destination determination program 256, the transmission destination information list update program 254, and the transmission program 258 correspond to a transmission destination determining section, a transmission destination information list updating section, and a transmitting section, respectively, in the claims.

The reception program 251 receives the image data and the transmission destination information list from the computer 100 or another projector. The image projection program 252 processes the received image data, and supplies the processed image data to the image projecting section 270, thereby projecting the image on the screen (not shown). The transmission destination information list update program 254 updates the transmission destination information list. One or both of the identification information and the IP address of the projector which has received the image data and the transmission destination information list is listed at the top of the pre-update transmission destination information list. The transmission destination information list update program 254 deletes a top line in which the information (the identification information or the IP address) of the projector is listed. As a result, the identification information or the IP address of a transmission destination projector to which the projector which has received the image data and the transmission destination information list transmits the image data and the transmission destination information list is moved to the top of the transmission destination information list.

Based on the transmission destination information list, the transmission destination determination program 256 determines a transmission destination projector to which the image data is transmitted. Specifically, the transmission destination determination program 256 determines the projector listed in the top line of the transmission destination information list as a transmission destination. The transmission program 258 transmits the image data and the transmission destination information list to the transmission destination projector determined by the transmission destination determination program 256.

Figure 4A:
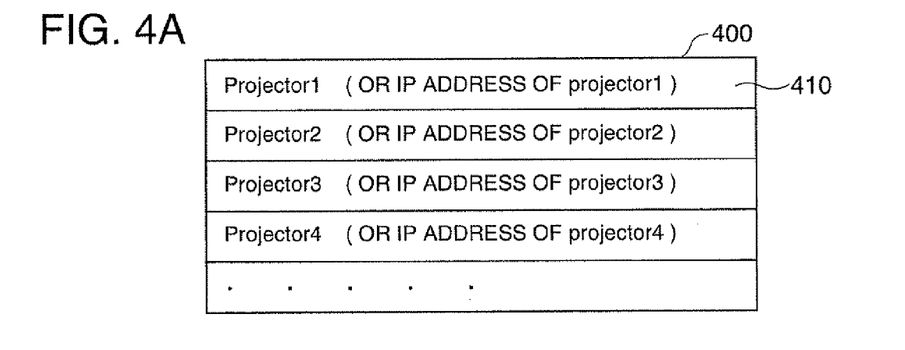
FIGS. 4A to 4D are explanatory diagrams showing the configuration of a transmission destination information list.
Figure 4B:
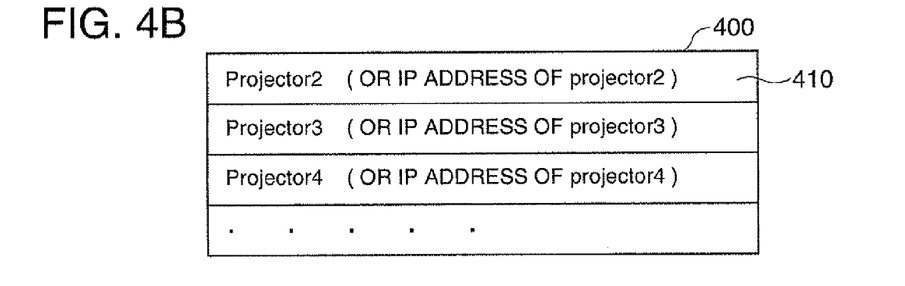
Figure 4C:
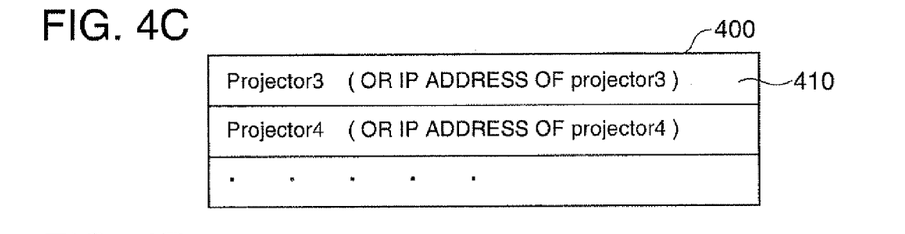
Figure 4D:
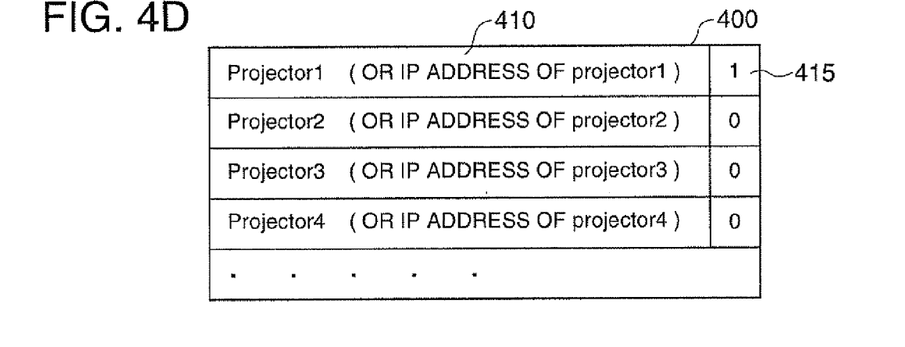

FIGS. 4A to 4D are explanatory diagrams showing the configuration of the transmission destination information list. FIG. 4A is a transmission destination information list 400 generated by the computer 100. FIGS. 4B and 4C show the transmission destination information list 400 updated by the projector, and FIG. 4D is a modified example. FIGS. 4B to 4D will be described later. The transmission destination information list 400 shown in FIG. 4A includes a projector identification name field 410 which stores an identification name of the projector. Incidentally, an IP address field which stores an IP address in place of an identification name of the projector may be provided. Both the projector identification name field 410 and the IP address field may be provided. The vertical relative position of the projector identification name field 410 represents the priority as a transmission destination, and transmission to the projector listed in the upper line is performed with higher priority. That is, in the example shown in FIGS. 4A to 4D, Projector1 (the projector 201) is a projector to which transmission is first performed.

Hereinafter, the operation of the image data transfer system will be described. First, the computer 100 transmits the image data and the transmission destination information list 400 shown in FIG. 4A to the projector 201. Next, the projectors 201 to 203 transmit (transfer) the image data to the next projectors 202 to 204, respectively, and update the transmission destination information list 400 and transmit the updated transmission destination information list 400 to the next projectors 202 to 204, respectively. In the following description, the projectors 201 to 204 will be collectively referred to as a "projector 200".

Figure 5:
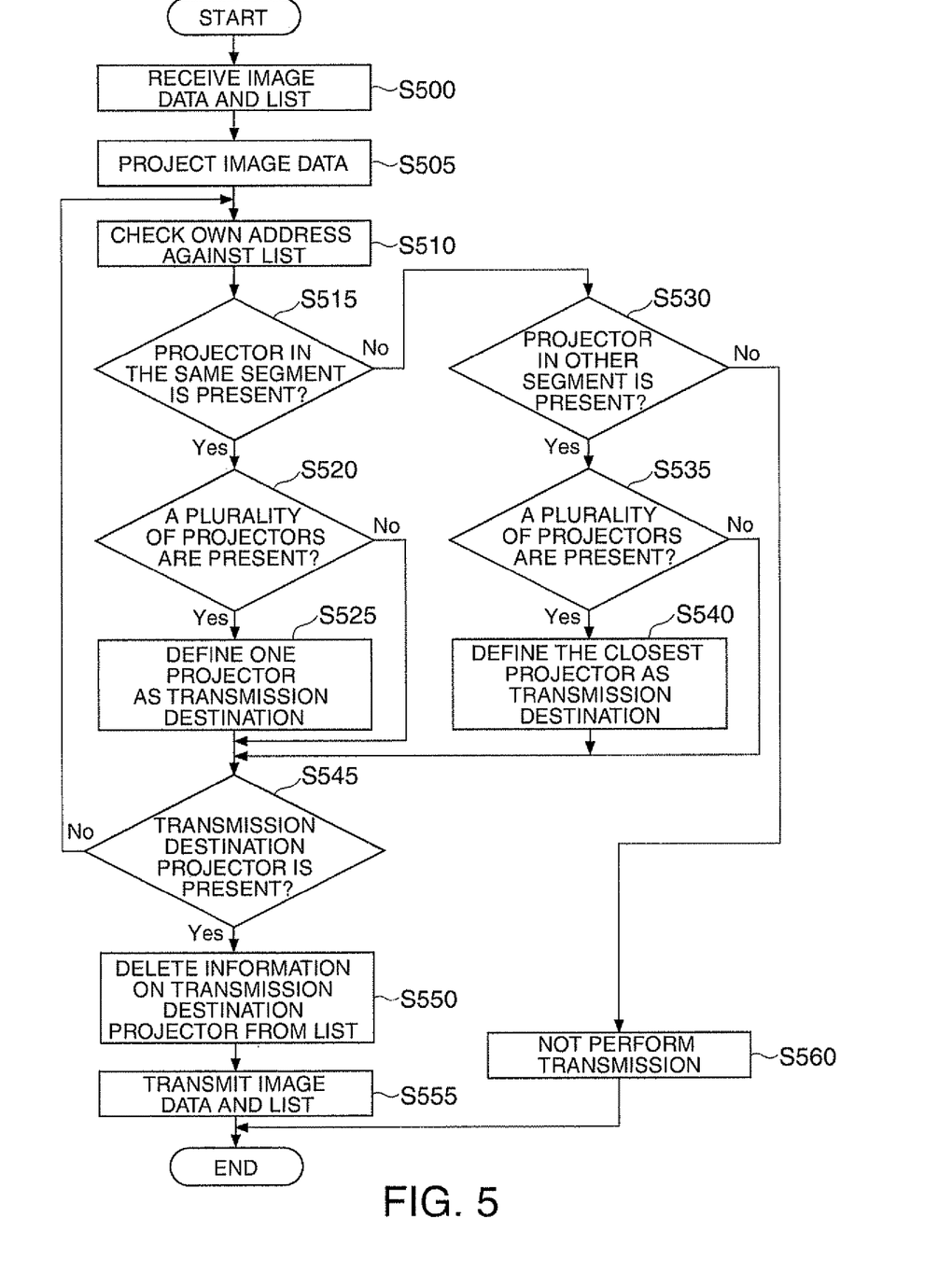
FIG. 5 is an operation flowchart of the projector.

FIG. 5 is an operation flowchart of the projector. In step S500, the CPU 220 of the projector 200 receives the image data and the transmission destination information list 400. In step S505, the CPU 220 projects the received image data on the screen (not shown) by using the image projecting section 270. Since the specific projection operation is a common operation in the projector, further descriptions will be omitted.

In step S510, the CPU 220 checks the own IP address against the transmission destination information list 400. Here, when the identification name of the projector is stored in the transmission destination information list 400, the CPU 220 obtains the IP address of each projector based on the identification name. Incidentally, the CPU 220 can obtain the IP address of each projector by making inquiries at a DNS server (not shown) or using a HOST file (not shown) stored in the flash memory 250.

In step S515, the CPU 220 determines whether or not a projector belonging to the same network segment as the network segment to which the CPU 220 belongs is listed in the transmission destination information list 400. The CPU 220 compares the network address part of the IP address of each projector listed in the transmission destination information list 400 with the network address part of the IP address of the own projector 200. If the transmission destination information list 400 includes a projector having the same network address as the own network address part, the projector other than the own projector, the CPU 220 determines that the projector belonging to the same network segment as the network segment to which the CPU 220 belongs is listed in the transmission destination information list 400.

In step S520, the CPU 220 determines whether or not a plurality of projectors belonging to the same network segment as the network segment to which the CPU 220 belongs are listed in the transmission destination information list 400. The CPU 220 counts the number of projectors having the same network address as the own network address part, the projectors other than the own projector. If the count value is 2 or more, the CPU 220 determines that a plurality of projectors belonging to the same network segment as the network segment to which the CPU 220 belongs are listed. In such a case, in step S525, the CPU 220 determines one of the plurality of projectors as a transmission destination. Specifically, the CPU 220 determines a projector of the plurality of projectors, the projector listed in the top line of the transmission destination information list 400, as a transmission destination. Incidentally, if a plurality of projectors belonging to the same network segment as the network segment to which the CPU 220 belongs are not listed (if only one projector is listed), the CPU 220 determines the one projector as a transmission destination.

In step S545, the CPU 220 checks the presence of the transmission destination projector thus determined. Even if the transmission destination projector is present in the transmission destination information list 400, when the transmission destination projector is OFF or is disconnected from the network, for example, the transmission destination projector cannot receive the image data. Since such a projector cannot transfer the image data, the projector has to be removed from the transmission destination. The CPU 220 can check the presence of the transmission destination projector by executing a Ping command, for example. If the transmission destination projector is not present, the CPU 220 goes back to step S510 and searches for another projector.

In step S550, the CPU 220 deletes the information on the own projector from the transmission destination information list 400, and updates the transmission destination information list 400. FIG. 4B shows the updated transmission destination information list when the projector 201 (Projector1) receives the image data and determines the projector 202 (Projector2) as a transmission destination projector. When the transmission destination information list 400 shown in FIG. 4B is compared with the transmission destination information list 400 of FIG. 4A, the information on the projector 201 is deleted from the transmission destination information list 400 shown in FIG. 4B. FIG. 4C shows the updated transmission destination information list 400 when the projector 202 (Projector2) receives the image data and determines the projector 203 (Projector3) as a transmission destination projector. When the transmission destination information list 400 shown in FIG. 4C is compared with the transmission destination information list 400 of FIG. 4B, the information on the projector 202 is deleted from the transmission destination information list 400 shown in FIG. 4C. In step S555, the CPU 220 transmits the image data and the updated transmission destination information list 400 to the projector determined as a transmission destination.

In step S515, if a projector belonging to the same network segment as the network segment to which the projector 201 (Projector1) comprising the CPU 220 belongs is not listed in the transmission destination information list 400, the CPU 220 determines in step S530 whether or not a projector belonging to a network segment which is different from the network segment to which the CPU 220 belongs is listed in the transmission destination information list 400. The CPU 220 compares the network address part of the IP address of the projector listed in the transmission destination information list 400 with the network address part of the IP address of the own projector 200. If a projector having a network address which is different from the own network address part is listed, the CPU 220 can determine that a projector belonging to a network segment which is different from the network segment to which the CPU 220 belongs is listed in the transmission destination information list 400.

In step S535, the CPU 220 determines whether or not a plurality of projectors belonging to a network segment which is different from the network segment to which the CPU 220 belongs are listed in the transmission destination information list 400. The CPU 220 counts the number of projectors having a network address which is different from the own network address part, the projectors other than the own projector. If the count value is 2 or more, the CPU 220 determines that a plurality of projectors are listed.

In such a case, in step S540, the CPU 220 determines one projector as a transmission destination. Specifically, the CPU 220 determines a projector of the plurality of projectors, the projector listed in the top line of the transmission destination information list 400, as a transmission destination. As described earlier, the CPU 120 of the computer 100 generates the transmission destination information list 400 in such a way that the projector closer to the computer 100 is arranged in the upper line of the transmission destination information list 400. Therefore, the CPU 220 is only required to determine the projector listed in the top line of the transmission destination information list 400 as a transmission destination. Incidentally, if a plurality of projectors are not listed (if only one projector is listed), the CPU 220 determines the one projector as a transmission destination. Instead, the CPU 220 may obtain the number of hops from the computer 100 to each projector by executing a tracert command and select a projector with the smallest number of hops, the tracert command is generally used for a route investigation. Then, the CPU 220 proceeds to step S545 and performs similar processing.

Figure 6A:
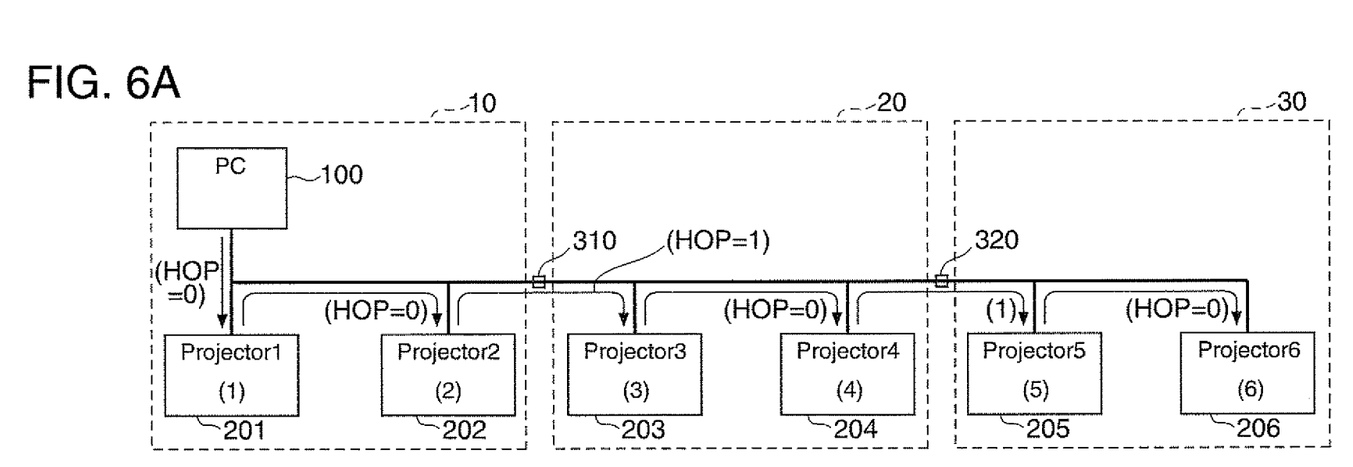
FIGS. 6A and 6B are explanatory diagrams for comparing this embodiment with existing unicast transmission, FIG. 6A showing transmission performed by this embodiment, and FIG. 6B showing transmission performed by unicast.
Figure 6B:
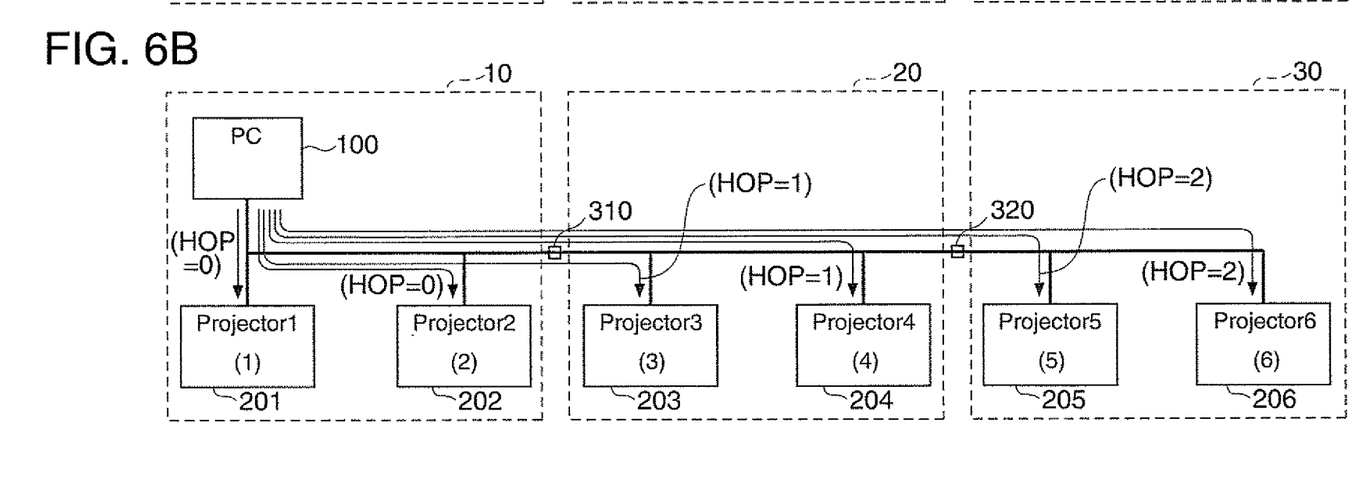

FIGS. 6A and 6B are explanatory diagrams for comparing this embodiment with existing unicast transmission. FIG. 6A shows transmission performed by this embodiment, and FIG. 6B shows transmission performed by unicast. A first network segment 10 includes a computer 100 and projectors 201 and 202, a second network segment 20 includes projectors 203 and 204, and a third network segment 30 includes projectors 205 and 206. The first network segment 10 and the second network segment 20 are connected to each other via a router 310, and the second network segment 20 and the third network segment 30 are connected to each other via a router 320.

When unicast transmission is performed, the computer 100 transmits the image data six times. On the other hand, in this embodiment, the computer 100 transmits the image data one time. Therefore, the computer 100 is under lighter load in this embodiment than when the unicast transmission is performed.

In general, the smaller the number of hops, the lighter the load on the network. When the load on the network is represented by the total number of hops, the total number of hops is 6 when unicast transmission is performed, and the total number of hops is 2 in this embodiment. Therefore, the network is under lighter load in this embodiment than when unicast transmission is performed.

Moreover, when unicast transmission is performed, for example, when the image data is transmitted from the computer 100 to the projector 206 (Projector6), other data communications in the network segments 10, 20, and 30 are restrained during transmission of the image data in order to prevent a conflict between data transmissions. On the other hand, according to this embodiment, for example, when the image data is transmitted from the projector 205 (Projector5) to the projector 206 (Projector6), while other data communications in the network segment 30 are restrained during transmission of the image data in order to prevent a conflict between data transmissions, data communications in the network segments 10 and 20 or between the network segments 10 and 20 can be performed without being restrained. That is, the network is less likely to be occupied in this embodiment than when unicast transmission is performed, and this embodiment provides higher flexibility to other communications than unicast transmission.

In the embodiment described above, a case in which destination projectors are present in a plurality of network segments has been described; however, all the projectors may be included in the same network segment. In such a case, determination in step S515 is Yes.

In this embodiment, the CPU 220 preferentially transmits the image data to a projector (the number of hops=0) belonging to the same network segment, and, when there is no projector belonging to the same network segment, the CPU 220 preferentially transmits the image data to a projector belonging to a different network segment with a small number of hops at the time of data transmission. However, it is also possible to reduce the load on the computer 100 by a configuration in which the image data is sequentially transferred with no consideration given to the number of hops. Incidentally, in such a case, there is a possibility that a data transfer by which the image data is reversely transmitted to a projector which has not yet received the image data, the projector of the original network segment, is performed, the total number of hops in data transmission is increased, and heavier load is applied to the network. Therefore, it is preferable that, as in this embodiment, the image data be sequentially transferred from the projector 201 which is close to the computer 10. By doing so, it is possible to prevent an increase in the load on the network.

In this embodiment, the information on the own projector is deleted when the transmission destination information list 400 is updated. However, for example, as shown in FIG. 4D, a flag field 415 may be provided to determine whether the data has not yet been transmitted based on the presence or absence of the flag. Incidentally, it is preferable to delete the information on the own projector as in this embodiment because doing so makes it possible to reduce the size of the transmission destination information list 400.

Second Embodiment

A second embodiment can be performed when the projectors are present in a plurality of network segments. In the first embodiment, the image data is preferentially transmitted to a projector (the number of hops=0) belonging to the same network segment, and, when there is no projector belonging to the same network segment, the image data is preferentially transmitted to a projector belonging to a different network segment with a small number of hops at the time of data transmission. On the other hand, in the second embodiment, the image data and the transmission destination information list 400 are first transmitted to a projector belonging to a different network segment with a small number of hops at the time of data transmission, and the image data and the transmission destination information list 400 are then transmitted to a projector (the number of hops=0) belonging to the same network segment. That is, in each network segment, a device (a computer 100) which first transmits the image data or a device (a projector 200) which has received the image data from the other segment first transmits the image data to a different transmission destination.

Figure 7:
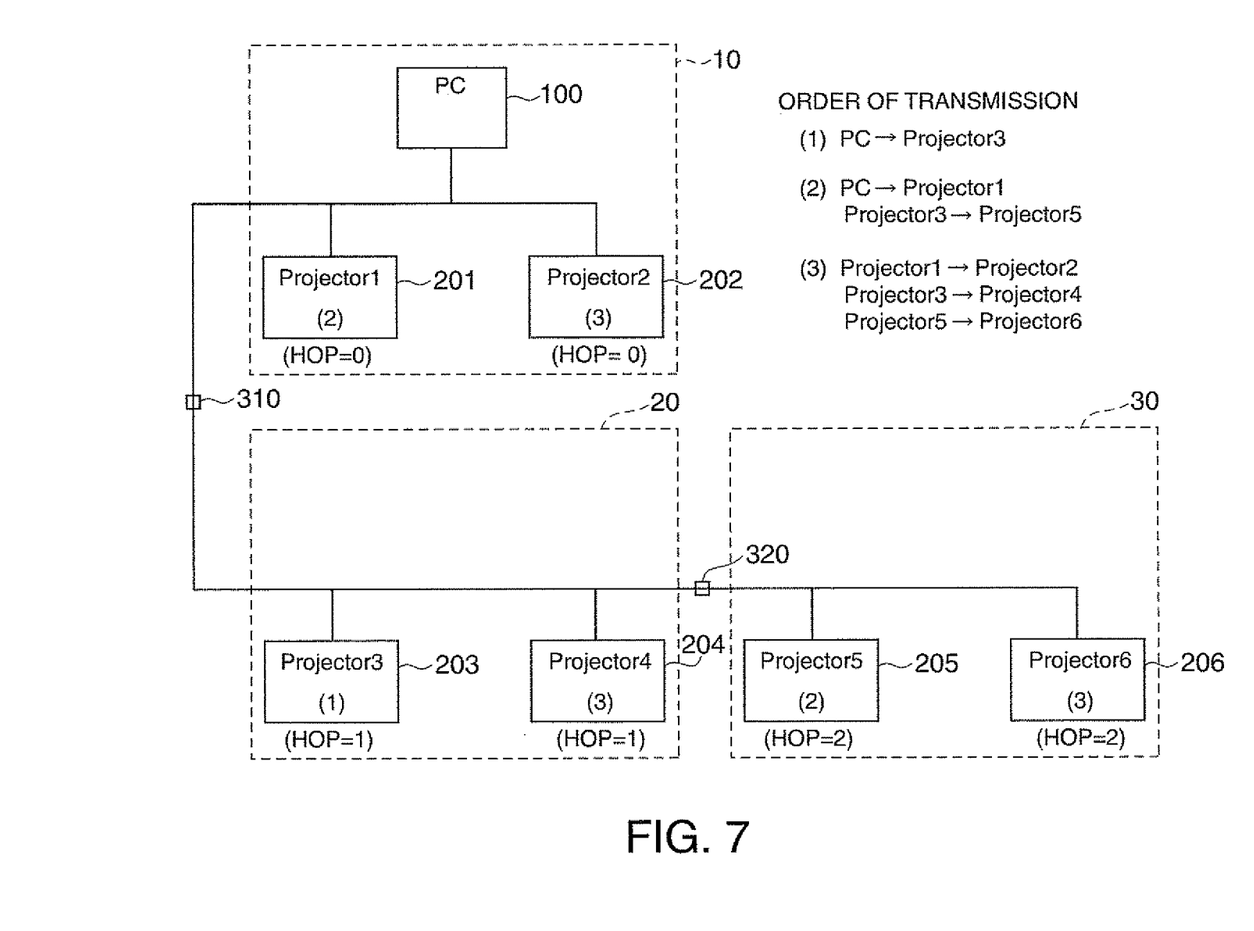
FIG. 7 is an explanatory diagram showing a second embodiment.

FIG. 7 is an explanatory diagram showing the second embodiment. The network configuration of the computer 100 and the projectors 201 to 206 is the same as the example shown in FIG. 6A. In the second embodiment, in the first step, the computer 100 transmits the image data and the transmission destination information list 400 to the projector 203. In the next step, the computer 100 transmits the image data and the transmission destination information list 400 to the projector 201, and the projector 203 transmits (transfers) the image data and the transmission destination information list 400 to the projector 205. In the next step, the projector 201 transmits (transfers) the image data and the transmission destination information list 400 to the projector 202, the projector 203 transmits (transfers) the image data and the transmission destination information list 400 to the projector 204, and the projector 205 transmits (transfers) the image data and the transmission destination information list 400 to the projector 206.

That is, in the second embodiment, since the computer 100 transmits, in the first step, the image data and the transmission destination information list 400 to the projector 203 of the network segment 20 which is different from the network segment to which the computer 100 belongs, in the next step, transmission by which the computer 100 transmits the image data and the transmission destination information list 400 to the projector 201 and transmission (transfer) by which the projector 203 transmits (transfers) the image data and the transmission destination information list 400 to the projector 205 can be performed concurrently. Moreover, in the third step, transmission (transfer) by which the projector 201 transmits (transfers) the image data and the transmission destination information list 400 to the projector 202, transmission (transfer) by which the projector 203 transmits (transfers) the image data and the transmission destination information list 400 to the projector 204, and transmission (transfer) by which the projector 205 transmits (transfers) the image data and the transmission destination information list 400 to the projector 206 can be performed concurrently. That is, in the first embodiment, the processing is performed in six steps; in this embodiment, the same processing can be performed in three steps. In other words, it is possible to reduce the number of process steps.

Figure 8A:
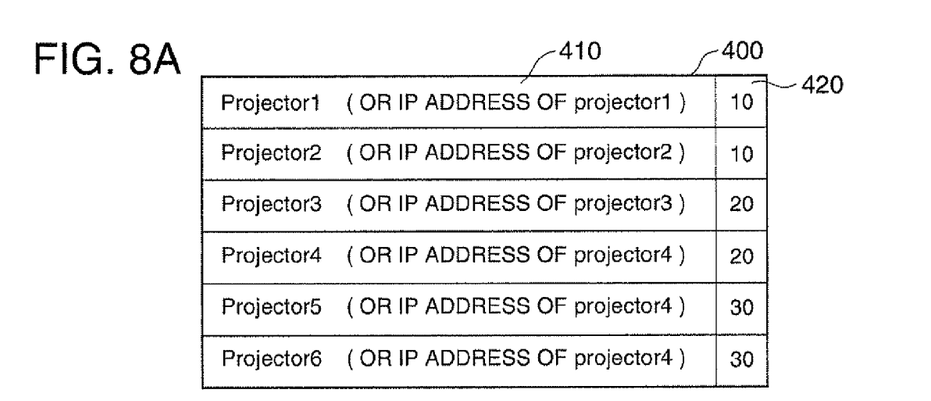
FIGS. 8A to 8E are explanatory diagrams showing the configuration of a transmission destination information list in the second embodiment.
Figure 8B:
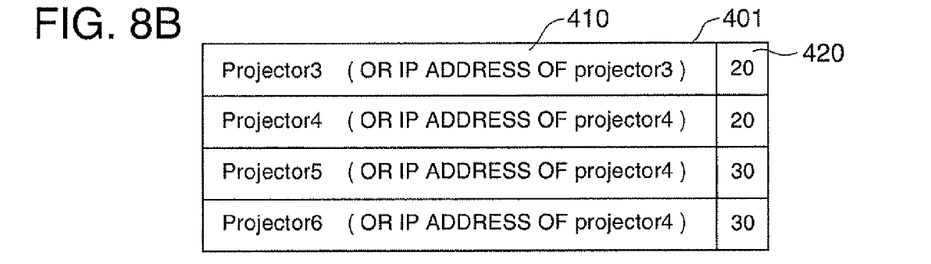
Figure 8C:
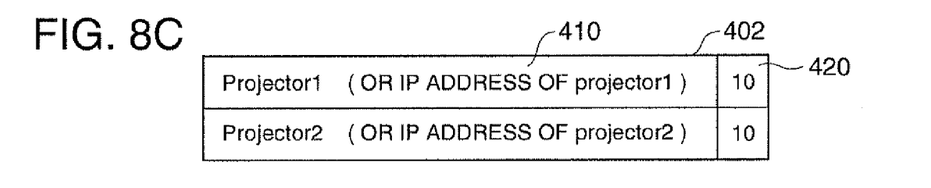
Figure 8D:
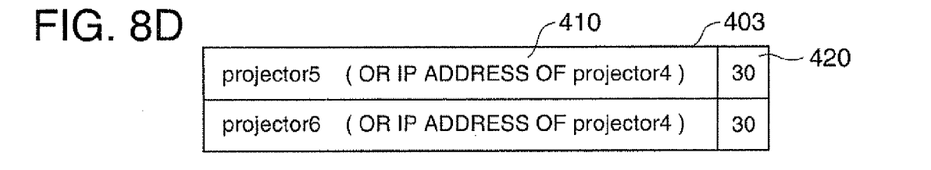
Figure 8E:
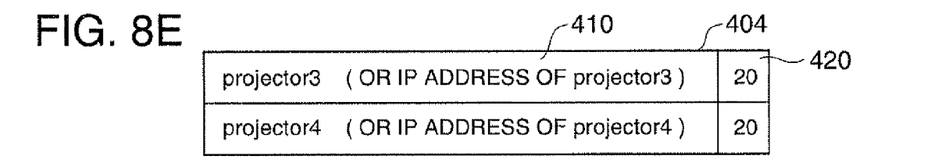

FIGS. 8A to 8E are explanatory diagrams showing the configuration of the transmission destination information list in the second embodiment. FIG. 8A shows the transmission destination information list 400 in which all the transmission destination projectors are listed. In addition to the projector identification name field 410, the transmission destination information list 400 includes a network segment identification name field 420. In this embodiment, numerals (10, 20, and 30) of the network segments are entered in the network segment identification name field 420. The CPU 120 of the computer 100 generates the transmission destination information list 400 in the same manner as in the first embodiment.

From the transmission destination information list 400, the CPU 120 generates a first transmission destination information list 401 which is transmitted to the projector of the network segment 20 and a second transmission destination information list 402 which is transmitted to the projector of the network segment 10. The projector, for example, the projector 203, of the network segment 20 does not transmit the image data to the projector of the network segment 10. Therefore, the CPU 120 generates the first transmission destination information list 401 by deleting the information on the projector of the network segment 10 from the transmission destination information list 400 shown in FIG. 8A. Moreover, the projector, for example, the projector 201, of the network segment 10 does not transmit the image data to the projector of the network segment 20 or 30. Therefore, the CPU 120 generates the second transmission destination information list 402 by deleting the information on the projectors of the network segments 20 and 30 from the transmission destination information list 400 shown in FIG. 8A. Incidentally, in this embodiment, the CPU 120 generates the first transmission destination information list 401 and the second transmission destination information list 402 after generating the transmission destination information list 400. However, the CPU 120 may directly generate the first transmission destination information list 401 and the second transmission destination information list 402.

The CPU 220 of the projector 203 which has received the first transmission destination information list generates a third transmission destination information list 403 which is transmitted to the projector of the network segment 30 and a fourth transmission destination information list 404 which is transmitted to the projector of the network segment 20. Specifically, the CPU 220 can generate the third transmission destination information list 403 by deleting the information on the projector of the network segment 20 from the first transmission destination information list 401 shown in FIG. 8B, and generate the fourth transmission destination information list 404 by deleting the information on the projector of the network segment 30 from the first transmission destination information list 401 shown in FIG. 8B.

Figure 9:
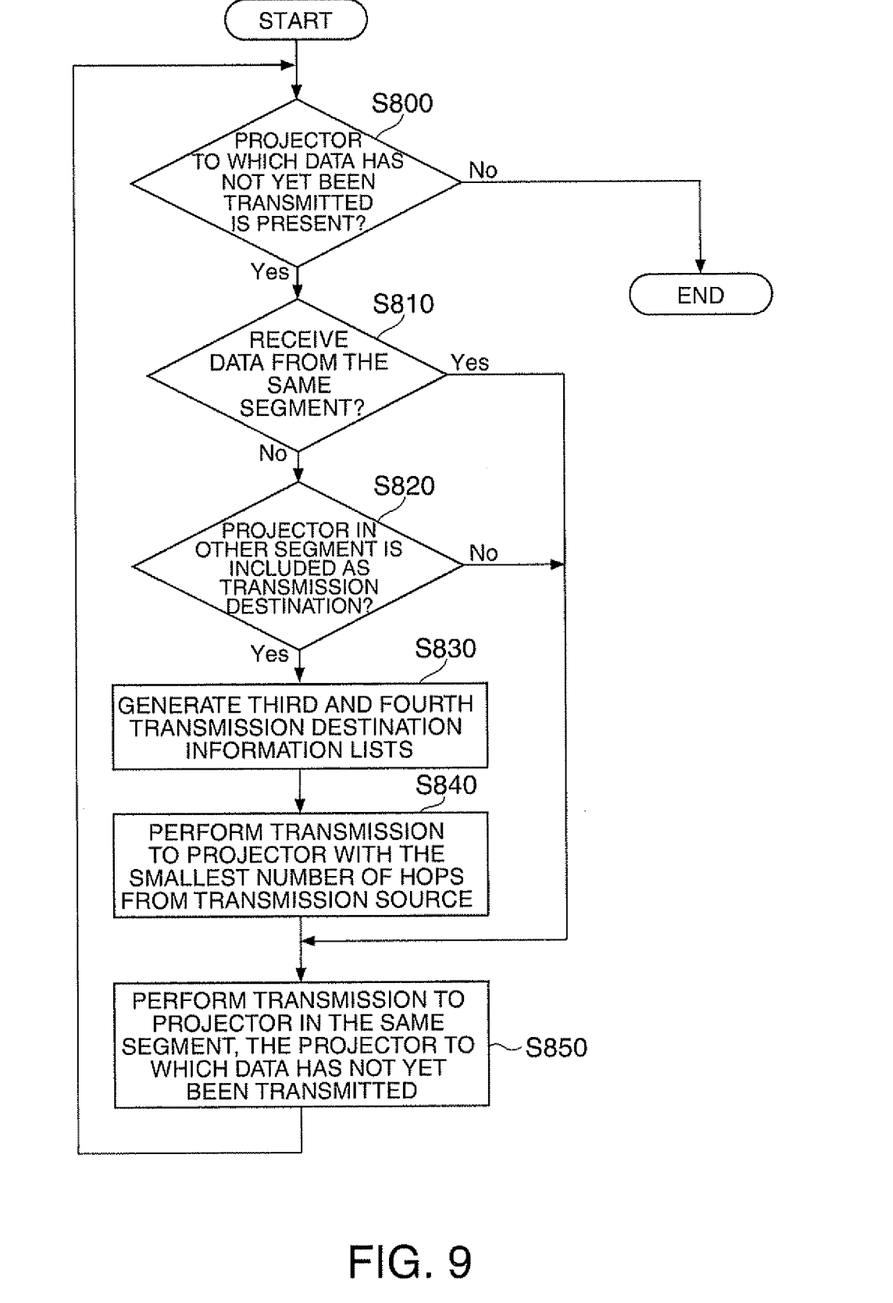
FIG. 9 is an operation flowchart of a projector in the second embodiment.

FIG. 9 is an operation flowchart of the projector in the second embodiment. In step S800, the CPU 220 of the projector 200 determines whether or not there is a projector to which data has not yet been transmitted. If the received transmission destination information list 400 (or the first to fourth transmission destination information lists 401 to 404) includes the information on the projector other than the own projector, the CPU 220 can determine that there is a projector to which data has not yet been transmitted. Incidentally, hereinafter, even when the received transmission destination information list is any one of the first to fourth transmission destination information lists 401 to 404, the received transmission destination information list is not differentiated from the transmission destination information list 400 and is also referred to simply as the "transmission destination information list 400".

In step S810, the CPU 220 determines whether or not the image data and the transmission destination information list 400 have been received from the computer 100 or the projector 200 of the same network segment as the network segment to which the projector 200 comprising the CPU 220 belongs by using the information in the header part of the image data or the transmission destination information list 400. If the image data and the transmission destination information list 400 have been received from the computer 100 or the projector 200 of the same network segment as the network segment to which the CPU 220 belongs, the CPU 220 proceeds to step S850, and transmits the image data and the updated transmission destination information list 400 to the projector 200 belonging to the same network segment as the network segment to which the CPU 220 belongs. At this time, in the same manner as in the first embodiment, the CPU 220 selects the projector which is at the top of the transmission destination information list 400, the projector other than the own projector, as a transmission destination, checks the presence of the transmission destination, and deletes the line in which the information on the own projector is described from the transmission destination information list 400 by update processing.

If the image data and the transmission destination information list 400 have been received from the computer 100 or the projector 200 of the network segment which is different from the network segment to which the CPU 220 belongs in step S810, the CPU 220 determines in step S820 whether or not the projector included in the other network segment is listed in the transmission destination information list 400. The CPU 220 compares the network address part of the IP address of the projector listed in the transmission destination information list 400 with the network address part of the IP address of the own projector 200. If the projector having the network address which is different from the own network address part is listed, the CPU 220 can determine that the projector belonging to the network segment which is different from the network segment to which the CPU 220 belongs is listed in the transmission destination information list 400.

If the projector belonging to the network segment which is different from the network segment to which the CPU 220 belongs is not listed in the transmission destination information list 400 in step S820, the CPU 220 proceeds to step S850. If the projector belonging to the network segment which is different from the network segment to which the CPU 220 belongs is listed in the transmission destination information list 400 in step S820, the CPU 220 proceeds to step S830, and generates the third and fourth transmission destination information lists 403 and 404 as described earlier.

In step S840, the CPU 220 determines the projector with the smallest number of hops at the time of transmission as a transmission destination, and transmits the image data and the third transmission destination information list 403 thereto. Specifically, the CPU 220 determines the projector listed in the top line of the third transmission destination information list 403 as a transmission destination. As mentioned earlier, the CPU 120 of the computer 100 generates the transmission destination information list 400 in such a way that the projector closer to the computer 100 is arranged in the upper line of the transmission destination information list 400. In addition, the information on the projector which is closer to the computer 100 than the network segment to which the CPU 220 belongs has already been deleted. Therefore, the CPU 220 is only required to determine the projector listed in the top line of the transmission destination information list 400 as a transmission destination. In step S840, the CPU 220 transmits the image data and the third transmission destination information list 403 to the projector listed at the top of the fourth transmission destination information list 404.

As described above, according to the second embodiment, since transmission of the image data can be performed concurrently in a plurality of network segments, it is possible to reduce the number of process steps in communication.

Incidentally, in the embodiments described above, the descriptions deal with cases in which the network segment is not branched. When the network segment is branched, in the branched network segment (the network segment to which three or more network segments are connected), the projector 200 which transmits the first image data may transmit the image data and the updated transmission destination information list 400 to one projector of each of the other network segments connected to the own network segment other than the network segment to which the projector 200 belongs and the two network segments of the network segment from which the image data has been transmitted, and then transmit the image data and the updated transmission destination information list 400 to the projector of the network segment to which the projector 200 belongs.

In the embodiments described above; the number of projectors listed in the transmission destination information list 400 decreases as the transfer of the image data is continuously performed. When the number of projectors included in the updated transmission destination information list 400 becomes one, the CPU 220 may transmit only the image data and may not transmit the updated transmission destination information list 400. In this case, since the projector which will receive the image data next does not have to transfer the image data to another projector, there is no need to transmit the transmission destination information list 400 to the projector which will receive the image data next. Moreover, when the projectors included in the received transmission destination information list 400 are two projectors, the own projector and one projector other than the own projector, the CPU 220 may transmit only the image data to the one projector other than the own projector without updating the transmission destination information list 400. This makes it possible to reduce the load on the network or the projector.

What is claimed is:

1. An image transfer method for transferring image data between a plurality of projectors, the method comprising:
   (a) receiving image data and a transmission destination information list including at least one projector as a transmission destination from another projector;
   (b) determining one projector of the plurality of projectors based on the transmission destination information list;
   (c) updating the transmission destination information list;
   (d) transmitting the updated transmission destination information list to the projector thus determined along with the image data; and
   (e) sequentially transferring the image data and the updated transmission destination information list between the plurality of projectors by repeating the processes (a) to (d), wherein in the process (b),
   when another projector which has not yet received the image data or the transmission destination information list is present in the same network segment as a network segment to which the projector belongs, the method further comprises
      (b-1) determining one projector in the same network segment as the network segment to which the projector belongs, and
   when another projector which has not yet received the image data or the transmission destination information list is not present in the same network segment as the network segment to which the projector belongs, the method further comprises
      (b-2) determining one projector which belongs to a network segment different from the network segment to which the projector belongs and has the smallest number of hops from the image supply unit.

2. An image transfer method for transferring image data between a plurality of projectors, the method comprising:
   (a) receiving image data and a transmission destination information list including at least one projector as a transmission destination from another projector;
   (b) determining one projector of the plurality of projectors based on the transmission destination information list;
   (c) updating the transmission destination information list;
   (d) transmitting the updated transmission destination information list to the projector thus determined along with the image data; and
   (e) sequentially transferring the image data and the updated transmission destination information list between the plurality of projectors by repeating the processes (a) to (d), wherein
   in the process (a), when a transmission source of the image data and the transmission destination information list belongs to the same network segment as the network segment to which the projector belongs,
      in the processes (b) and (d), the method further comprises
         (b-1) determining one projector which belongs to the same network segment as the network segment to which the projector belongs and has not yet received the image data based on the transmission destination information list, and
         (d-1) transmitting the updated transmission destination information list obtained by updating the transmission destination information list to the projector thus determined along with the image data, and
   in the process (a), when the transmission source of the image data and the transmission destination information list belongs to a network segment different from the network segment to which the projector belongs,
      in the process (c), the method further comprises generating a first transmission destination information list to be transmitted to another projector which belongs to a network segment different from the network segment to which the projector belongs and a second transmission destination information list to be transmitted to another projector which belongs to the same network segment as the network segment to which the projector belongs by using the transmission destination information list, and
      in the processes (b) and (d), the method further comprises
         (b-2) determining one projector which belongs to a network segment different from the network segment to which the projector belongs and has the smallest number of hops from the projector which performs transmission of the image data based on the first transmission destination information list,
         (d-2) transmitting the image data and the first transmission destination information list to the projector thus determined,
         (b-3) determining one projector which belongs to the same network segment as the network segment to which the projector belongs and has not yet received the image data based on the second transmission destination information list, and
         (d-3) transmitting the image data and the second transmission destination information list to the projector thus determined.

3. An image transfer system which supplies image data to a plurality of projectors from an image supply unit via a network, comprising:
   an image supply unit supplying image data; and
   a plurality of projectors which project an image based on the image data, wherein
   the image supply unit includes
   a transmission destination information list generating section that generates a transmission destination information list for determining a transmission destination of the image data,
   a transmission destination determining section that determines, based on the transmission destination information list, a transmission destination projector to which the image data is transmitted, and
   a transmitting section that transmits the image data and the transmission destination information list to the transmission destination projector determined by the transmission destination determining section, and
   the projector includes
   a receiving section that receives the image data and the transmission destination information list including a plurality of projectors as a transmission destination from the image supply unit or another projector,
   a transmission destination determining section that determines, based on the transmission destination information list, one projector of the plurality of projectors, a transmission destination information list updating section that updates the transmission destination information list, a transmitting section that transmits the updated transmission destination information list to the projector thus determined along with the image data, and a projecting section that projects an image based on the image data, wherein when another projector which has not yet received the image data or the transmission destination information list is present in the same network segment as a network segment to which the projector belongs, the projector determines one projector in the same network segment as the network segment to which the projector belongs, and when another projector which has not yet received the image data or the transmission destination information list is not present in the same network segment as the network segment to which the projector belongs, the projector determines one projector which belongs to a network segment different from the network segment to which the projector belongs and has the smallest number of hops from the image supply unit.

4. A projector comprising:

a receiving section that receives image data and a transmission destination information list including at least one projector as a transmission destination from an image supply unit or another projector;

a transmission destination determining section that determines one projector of a plurality of projectors based on the transmission destination information list;

a transmission destination information list updating section that updates the transmission destination information list;

a transmitting section that transmits the updated transmission destination information list to the projector thus determined along with the image data; and a projecting section that projects an image based on the image data, wherein when another projector which has not yet received the image data or the transmission destination information list is present in the same network segment as a network segment to which the projector belongs, the projector determines one projector in the same network segment as the network segment to which the projector belongs, and when another projector which has not yet received the image data or the transmission destination information list is not present in the same network segment as the network segment to which the projector belongs, the projector determines one projector which belongs to a network segment different from the network segment to which the projector belongs and has the smallest number of hops from the image supply unit.

5. A projector comprising:

a receiving section that receives image data and a transmission destination information list including at least one projector as a transmission destination from an image supply unit or another projector;

a transmission destination determining section that determines one projector of a plurality of projectors based on the transmission destination information list;

a transmission destination information list updating section that updates the transmission destination information list;

a transmitting section that transmits the updated transmission destination information list to the projector thus determined along with the image data; and a projecting section that projects an image based on the image data, wherein when a transmission source of the image data and the transmission destination information list belongs to the same network segment as the network segment to which the projector belongs, the projector determines one projector which belongs to the same network segment as the network segment to which the projector belongs and has not received the image data based on the transmission destination information list, and transmits the updated transmission destination information list obtained by updating the transmission destination information list to the projector thus determined along with the image data, and when the transmission source of the image data and the transmission destination information list belongs to a network segment different from the network segment to which the projector belongs, the projector generates a first transmission destination information list to be transmitted to another projector which belongs to a network segment different from the network segment to which the projector belongs and a second transmission destination information list to be transmitted to another projector which belongs to the same network segment as the network segment to which the projector belongs by using the transmission destination information list, determines, based on the first transmission destination information list, one projector which belongs to a network segment different from the network segment to which the projector belongs and has the smallest number of hops from the projector which performs transmission of the image data, transmits the image data and the first transmission destination information list to the projector thus determined, determines, based on the second transmission destination information list, one projector which is included in the same network segment as the network segment to which the projector belongs and has not yet received the image data, and transmits the image data and the second transmission destination information list to the projector thus determined.

* * * * *